(12) United States Patent
Arning et al.

(10) Patent No.: US 10,399,259 B2
(45) Date of Patent: Sep. 3, 2019

(54) ROTARY TABLET PRESS

(71) Applicant: Fette Compacting GmbH, Schwarzenbek (DE)

(72) Inventors: Andreas Arning, Talkau (DE); Nils Petersen, Hohnstorf (DE)

(73) Assignee: Fette Compacting GmbH, Schwarzenbek (DE)

( * ) Notice: Subject to any disclaimer, the term of this patent is extended or adjusted under 35 U.S.C. 154(b) by 141 days.

(21) Appl. No.: 15/411,088

(22) Filed: Jan. 20, 2017

(65) Prior Publication Data
US 2017/0210043 A1    Jul. 27, 2017

(30) Foreign Application Priority Data
Jan. 21, 2016   (DE) .......................... 10 2016 101 028

(51) Int. Cl.
| | |
|---|---|
| B29C 43/58 | (2006.01) |
| B29C 43/02 | (2006.01) |
| B29C 43/36 | (2006.01) |
| B29C 43/50 | (2006.01) |
| B30B 11/00 | (2006.01) |
| B30B 11/08 | (2006.01) |
| B30B 15/32 | (2006.01) |
| B29K 105/00 | (2006.01) |

(52) U.S. Cl.
CPC .............. *B29C 43/58* (2013.01); *B29C 43/02* (2013.01); *B29C 43/36* (2013.01); *B29C 43/50* (2013.01); *B30B 11/005* (2013.01); *B30B 11/08* (2013.01); *B30B 15/32* (2013.01); *B29C 2043/5046* (2013.01); *B29C 2043/585* (2013.01); *B29C 2043/5808* (2013.01); *B29C 2043/5866* (2013.01); *B29K 2105/251* (2013.01)

(58) Field of Classification Search
CPC ............ B29C 43/58; B29C 2043/5808; B29C 2043/5825; B29C 2043/585; B29C 2043/5866; B29C 2043/5875
See application file for complete search history.

(56) References Cited

U.S. PATENT DOCUMENTS

| | | | |
|---|---|---|---|
| 4,772,251 A | 9/1988 | Goppelt et al. | |
| 5,040,353 A * | 8/1991 | Evans | B07C 5/3404 209/644 |
| 5,322,655 A * | 6/1994 | Ebey | B29C 43/58 264/109 |

(Continued)

FOREIGN PATENT DOCUMENTS

| | | |
|---|---|---|
| DE | 2450065 A1 | 4/1976 |
| DE | 3636918 A1 | 5/1988 |

(Continued)

OTHER PUBLICATIONS

Filing Date Jan. 18, 2017; EP Search Report dated Jul. 3, 2017; 12 pages, EP 3199333.

*Primary Examiner* — Timothy Kennedy
(74) *Attorney, Agent, or Firm* — Barclay Damon LLP

(57) ABSTRACT

A rotary tablet press having a rotatably driven rotor and a die plate with a plurality of die bores. A plurality of upper and lower punches are configured to produce tablets in the plurality of die bores. The tablets are monitored for one or more characteristics and are sorted by an ejection apparatus according to the one or more characteristics into a reject channel and a satisfactory channel.

11 Claims, 2 Drawing Sheets

(56) References Cited

U.S. PATENT DOCUMENTS

| | | |
|---|---|---|
| 8,801,416 B2 | 8/2014 | Uneme |
| 2009/0074900 A1 | 3/2009 | Meier et al. |
| 2015/0375268 A1 | 12/2015 | Hegel et al. |

FOREIGN PATENT DOCUMENTS

| | | |
|---|---|---|
| DE | 4312550 C1 | 9/1994 |
| DE | 102013202975 A1 | 8/2014 |
| EP | 1688243 B1 | 8/2006 |
| EP | 2036707 A2 | 3/2009 |
| EP | 2664551 A1 | 11/2013 |
| JP | 2012006058 A | 1/2012 |

\* cited by examiner

ROTARY TABLET PRESS

CROSS REFERENCE TO RELATED INVENTION

This application is based upon and claims priority to, under relevant sections of 35 U.S.C. § 119, German Patent Application No. 10 2016 101 028.6, filed Jan. 21, 2016, the entire contents of which are hereby incorporated by reference.

BACKGROUND

The invention relates to a rotary tablet press comprising a rotatably driven rotor having a die plate with die bores and a plurality of upper and lower punches rotating with the die plate for producing tablets in the die bores, wherein the die plate of the rotor is assigned a deflector which deflects satisfactory tablets, which are produced in the die bores and ejected by the lower punches from the die bores, from the upper face of the die plate into a satisfactory channel, wherein in the rotational direction of the rotor a reject channel is arranged upstream of the satisfactory channel, an ejection apparatus being assigned thereto for ejecting reject or unsatisfactory tablets into the reject channel, wherein moreover a monitoring apparatus is arranged on the rotary tablet press, said monitoring apparatus monitoring at least one property of the tablets produced in the die bores and producing a reject signal for a control apparatus when the monitored property of a tablet deviates inadmissibly from a reference value, so that the control apparatus actuates the ejection apparatus for ejecting the reject tablets.

Tablets produced in the rotary tablet press are generally deflected into a satisfactory channel by means of a deflector from the die plate rotating below the deflector. The deflector may, for example, have a sickle-shaped deflection edge. Powdery material, which has been filled into the die bores of the die plate, is pressed by the upper and lower punches of a rotary tablet press in the die bores to form tablets. After the compression, the tablets are pushed by the lower punches out of the die bores toward the upper face of the die plate so that they may be deflected from the die plate by the deflector.

During the tablet production a monitoring apparatus monitors the tablets for specific parameters. For example, a pressing force measuring apparatus is able to monitor whether the pressing force which prevails during the compression of the tablet is within an admissible reference value range. If the monitoring apparatus establishes an inadmissible deviation from a reference value, it produces a reject signal which is emitted to a control apparatus, for example the machine controller of the rotary tablet press. The control apparatus then controls an ejection apparatus for targeted ejection of the rejected tablet. To this end, the ejection apparatus may be configured as an ejection nozzle which produces a puff of gas, in particular a puff of air, which blows the rejected tablet from the die plate, before reaching the deflector, into a reject channel arranged in the rotational direction of the rotor upstream of the satisfactory channel.

Such a rotary tablet press is disclosed, for example, in EP 1 688 243 B1. In this case, the tablets entering the reject channel or the satisfactory channel have to be conveyed further through the reject channel or, respectively, the satisfactory channel. To this end, in the rotary tablet press disclosed in EP 1 688 243 B1 a nozzle arrangement is provided for the reject channel and for the satisfactory channel. The nozzle arrangements produce an airflow into the reject channel or, respectively, into the satisfactory channel so that the tablets are discharged through the reject channel or, respectively, the satisfactory channel. A further nozzle arrangement is provided, said nozzle arrangement producing an airflow oriented toward a deflection portion of the deflector. The nozzle arrangements may in this case have a series of nozzle openings arranged adjacent to one another so that air mist or, respectively, an air curtain is produced. A drawback here is that the nozzle arrangements may result in tablet dust being raised and undesirable contamination of the rotary tablet press or, respectively, the surroundings.

It is known from U.S. Pat. No. 8,801,416 A to discharge tablets produced in a tablet press by vacuum apparatuses. In this case, tablets are initially supplied from the die plate to a tablet reservoir as a result of gravity. From this tablet reservoir the tablets are then conveyed further by a vacuum apparatus. A drawback here is that when the press stops, for example, loose tablets may remain on the die plate. These loose tablets may collide with subsequently produced tablets when the pressing operation then starts up again due to their inertia and lead to a back-up of tablets. Moreover, a construction comprising a tablet reservoir is costly.

BRIEF SUMMARY OF THE INVENTION

In rotary tablet presses of the type described in the prior art, a clear detection of ejected reject tablets is not always ensured. Thus the pressure build-up of the respective nozzle arrangement is monitored for detecting the ejected reject tablets. If the nozzle arrangement is, for example, blocked by dust being raised and as a result a greater pressure is built up, this may lead to faulty detection results. Moreover, there is often the desire to implement a redundant detection of ejected tablets. The prior art does not provide this.

Proceeding from the prior art set forth, the object of the invention is to provide a rotary tablet press of the type mentioned in the introduction in which ejected reject tablets are able to be detected clearly and, in particular, a redundant detection of ejected tablets may also be implemented.

The monitoring apparatus provided according to the invention, for example, may be a pressing force measuring apparatus of the rotary tablet press which measures the pressing force produced during the pressing of the tablets. The control apparatus may, for example, be the machine controller of the rotary tablet press. As mentioned in the introduction, the monitoring apparatus monitors at least one property of the tablets produced, for example the pressing force produced in the course of production, and compares this property with a reference value. If an inadmissible deviation from the reference value is established, the monitoring apparatus emits a corresponding reject signal to the control apparatus. Immediately, the control apparatus activates the ejection apparatus such that the rejected is ejected into the reject channel. The ejection apparatus may be an ejection nozzle which produces a puff of gas, preferably a puff of air, by which tablets to be ejected before reaching the deflector are blown from the die plate into the reject channel. However, a mechanical ejection apparatus which mechanically ejects tablets into the reject channel is also conceivable.

According to the invention, a first detector apparatus is arranged in the reject channel, said first detector apparatus detecting tablets passing through the reject channel. Moreover, a second detector apparatus is arranged in the satisfactory channel, said second detector apparatus detecting tablets passing through the satisfactory channel. As mentioned in the introduction, in the prior art a detection of ejected tablets takes place by monitoring the pressure build-up in nozzle arrangements used for the transport of tablets through the reject channel and/or the satisfactory channel. As also mentioned in the introduction, for example, a blockage of the nozzle arrangements may lead to faulty detection results. This problem is overcome according to the invention. Moreover, as already explained in the introduction, often there is the desire to implement a redundant detection of ejected tablets. This is possible by means of the invention.

Since a corresponding detector apparatus is positioned both in the reject channel and in the satisfactory channel, on the one hand, the ejected tablets conveyed through the reject channel may be directly detected. On the other hand, in the tablet flow discharged through the satisfactory channel a gap corresponding to the ejected reject tablet may be detected, and thus indirectly the ejected tablet. Thus a reliable redundant monitoring of the tablet ejection is ensured. Faulty detection results due to blocked nozzle openings or the like are eliminated.

A further advantage of the detector apparatuses provided according to the invention is the identification of a back-up of tablets. In the prior art costly capacitive tablet back-up detectors are used for this purpose. By the use of the detector apparatuses according to the invention, a back-up of tablets may be easily ascertained when the corresponding detector apparatus detects no interruptions or a permanent interruption.

The first detector apparatus may comprise a light barrier and/or the second detector apparatus may comprise a light barrier. The light barriers may, in particular, be tubular light barriers. By means of light barriers a particularly reliable and accurate identification of tablets and/or gaps in the tablet flow is possible.

According to one embodiment, a first vacuum apparatus may be arranged in the reject channel, such that tablets ejected by the ejection apparatus in the direction of the reject channel are discharged by the vacuum produced by the first vacuum apparatus through the reject channel. A second vacuum apparatus may be arranged in the satisfactory channel, such that tablets deflected by the deflector in the direction of the satisfactory channel are suctioned from the die plate by the vacuum produced by the second vacuum apparatus and are discharged through the satisfactory channel. The first vacuum apparatus may be a Venturi nozzle and/or the second vacuum apparatus may be a Venturi nozzle.

Tablets ejected in the direction of the reject channel are discharged through the reject channel by the suction produced by the first vacuum apparatus. Tablets deflected in the direction of the satisfactory channel are suctioned from the die plate by the suction produced by the second vacuum apparatus and discharged through the satisfactory channel. In a vacuum apparatus, a vacuum is produced, for example, by the provision of a cross-sectional narrowing or the blowing of a compressed gas, for example compressed air, in a circular manner. As a result of this vacuum, gas, for example air, is suctioned and entrained in the direction of flow through the further channel line. This gas, in particular air, which is entrained due to the suction produced by the vacuum apparatus thus conveys the tablets through the reject channel or, respectively, the satisfactory channel. At the same time, in particular, tablets are already suctioned from the die plate by the second vacuum apparatus arranged in the satisfactory channel and conveyed further through the satisfactory channel. In particular, all tablets which have been ejected from the die bores by the second vacuum apparatus, and which have not been deflected by the ejection apparatus in the direction of the reject channel, can be suctioned into the satisfactory channel. As a result it is ensured that, for example when the rotary tablet press is stopped, no loose tablets remain on the die plate.

Nozzle arrangements provided in the prior art for conveying the tablets through the reject channel or, respectively, the satisfactory channel may be dispensed with in this embodiment. As a result, the raising of dust and soiling, which occurs in the prior art devices, and which hinders tablet detection, are avoided. The tablets are also accelerated and separated into the reject channel or, respectively, the satisfactory channel so that the spaces between the tablets become larger. As a result, the tablets are reliably prevented from backing-up. By the increased space between the tablets suctioned by the vacuum apparatuses, moreover, the redundant detection according to the invention of ejected reject tablets is improved.

The first detector apparatus may be arranged in the first vacuum apparatus and/or the second detector apparatus may be arranged in the second vacuum apparatus. As mentioned above, tablet dust is suctioned off by the use of a vacuum apparatus. This applies, in particular, inside the vacuum apparatus in the direction of flow directly downstream of the connection of a suction pipe portion. For example, light barriers may be positioned in this region, the optics thereof remaining clean at all times, so that said light barriers may reliably detect tablets conveyed by the vacuum apparatus. The detector apparatus may thus be arranged in the direction of flow of the gas and/or of the air through the cross-sectional narrowing of the vacuum apparatus immediately downstream of the connection region of a suction pipe portion for the gas, in particular air, suctioned by the vacuum.

The rotary tablet press according to the invention may also comprise a vacuum control apparatus which controls the vacuum produced by the first vacuum apparatus and the vacuum produced by the second vacuum apparatus, wherein the vacuum control apparatus is able to adjust the vacuum produced by the first vacuum apparatus and the vacuum produced by the second vacuum apparatus independently of one another, thus in particular in a variable manner. The vacuum control apparatus may also comprise a memory apparatus in which for specific operating modes reference values of vacuums for the first and the second vacuum apparatuses, for example specific to the products to be compressed, are stored. Then depending on the respective operating mode, the vacuum control apparatus accesses the memory apparatus and adjusts the vacuums produced by the first and/or second vacuum apparatus to the respectively stored value. In this manner, the vacuum apparatuses may be adjusted in a particularly targeted manner to the respective application.

BRIEF DESCRIPTION OF THE DRAWINGS

An exemplary embodiment of the invention is described in more detail hereinafter with reference to the drawings, in which schematically.

DETAILED DESCRIPTION OF THE INVENTION

Figure 1:
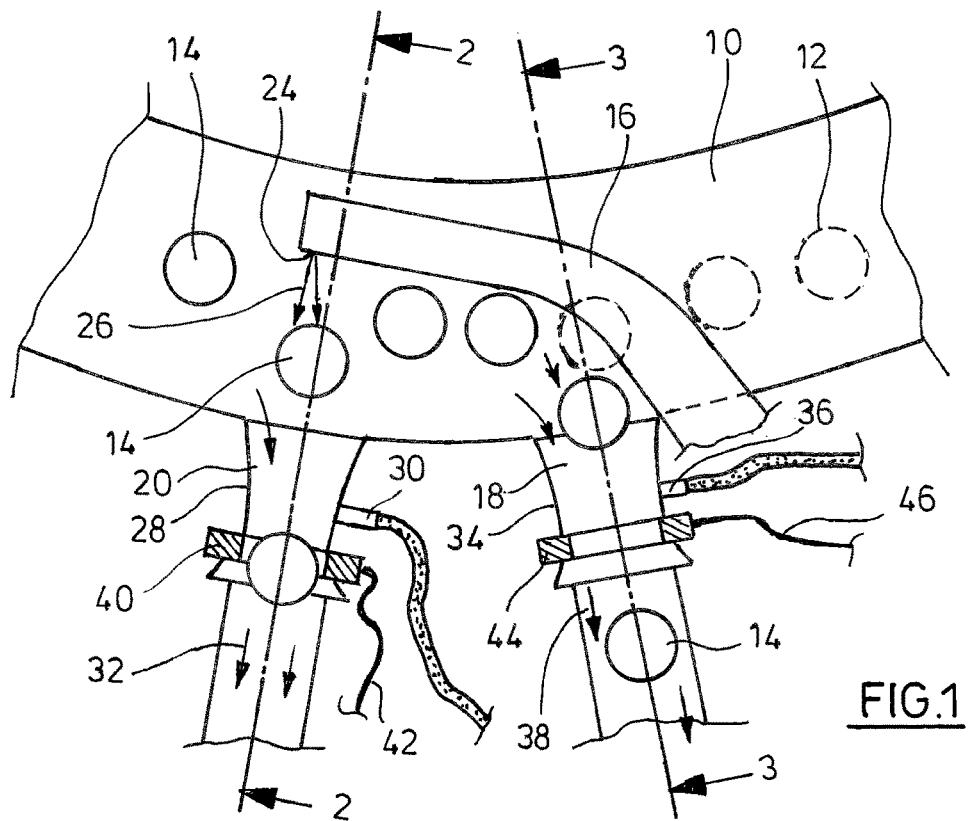
FIG. 1 illustrates a partial cross section view of an embodiment of a rotary tablet.

In FIG. 1, a part of a rotary tablet press according to the invention is shown in a partial sectional view. The rotary tablet press, not shown in more detail, has a housing in a manner known per se in which a rotor is arranged, said rotor being rotatably driven about a vertical axis by a drive. The rotor has a die plate shown in FIG. 1 by the reference numeral 10. The die plate 10 may be configured in one piece or may be made up of a plurality of annular segments. The die plate 10 has a series of die bores 12 arranged along a circular path. In each case a pair of upper punches 11 (not shown) and lower punches 13 (not shown) are assigned to the die bores 12. In a manner known per se, the upper punches 11 (not shown) and the lower punches 13 (not shown) are axially guided in upper punch receivers and lower punch receivers. The axial movement thereof performed in the course of one revolution is controlled by suitable control cams in a manner also known per se. In a filling apparatus of the rotary press, not shown, pressing material, which is filled into the die bores 12, is pressed in at least one pressing station of the rotary tablet press by the upper punches and lower punches into the die bores 12 to form tablets 14 in a manner also known per se. The die bores 12 may be formed by dies releasably inserted into the die plate 10. It is also conceivable, however, that the upper and lower punches of the rotary tablet press cooperate directly with the die bores 12 of the die plate 10 for producing tablets.

Figure 2:
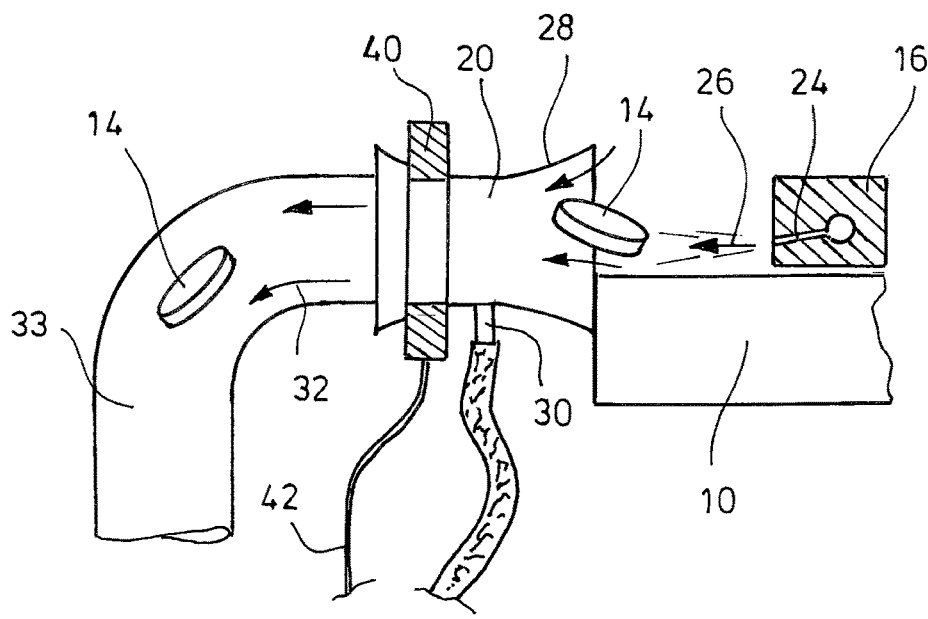
FIG. 2 illustrates a cross section view of the rotary tablet press of FIG. 1 along the line 2-2.

After producing the tablets 14, said tablets 14 are ejected from the die bores 12 by the lower punches, so that they are located on the upper face of the die plate 10. The die plate 10 is assigned a deflector 16 with a sickle-shaped deflection surface, below which the die plate 10 rotates. As may be clearly identified, in particular in FIG. 1, the deflector 16 deflects the tablets 14 located on the upper face of the die plate 10 in the direction of a satisfactory channel 18. In the rotational direction of the die plate 10 a reject channel 20 is located upstream of the satisfactory channel 18. Opposite the reject channel 20, an ejection nozzle 24 is integrated into the deflector 16. If the ejection nozzle 24 is activated, it produces a puff of air in the direction of the reject channel 20 as illustrated in FIGS. 1 and 2 by the reference numeral 26. This puff of air deflects a tablet 14 located in the region of the ejection nozzle 24, before reaching the deflector 16, into the reject channel 20. The ejection nozzle 24 is activated by a control apparatus (not shown), for example the machine controller of the rotary tablet press, when the control apparatus (not shown) receives a reject signal from a monitoring apparatus (not shown), of the rotary tablet press, for example a pressing force measuring apparatus. The monitoring apparatus (not shown), for example, monitors the pressing force produced when producing the tablets 14 and produces a reject signal when the pressing force deviates from a reference value in an inadmissible manner. This basic construction is known and, therefore, is not intended to be described in more detail.

A first vacuum apparatus 28, in particular a Venturi nozzle with a cross-sectional narrowing, is located in the reject channel 20, a suction pipe portion 30 being adjoined in the region thereof. During operation, the air flowing through the cross-sectional narrowing of the first vacuum apparatus 28 produces a vacuum in the region of the cross-sectional narrowing so that air is suctioned via the suction pipe portion 30 and entrained in the direction of conveyance away from the die plate 10 through the reject channel 20, as illustrated by the arrows 32. As a result, tablets 14 ejected by the ejection nozzle 24 into the reject channel 20 are also entrained and discharged through the reject channel 20 into a channel portion shown in FIG. 2 by the reference numeral 33, which for example leads to a reject container for tablets to be ejected.

In the satisfactory channel 18 into which the deflector 16 conveys tablets 14 not ejected by the ejection nozzle 24, a second vacuum apparatus 34 is located, in particular a Venturi nozzle with a cross-sectional narrowing, in turn a suction pipe portion 36 being adjoined in the region thereof. As in the first vacuum apparatus 28, the cross-sectional narrowing of the second vacuum apparatus 34 also results in air flowing through this cross-sectional narrowing producing a vacuum, which draws in air via the suction pipe portion 36, which then in turn is entrained through the satisfactory channel 18, in the direction of conveyance away from the die plate 10, as illustrated by the arrow 32. As a result in the example shown, all of the tablets 14 which have been fully ejected by the lower punches from the die bores 12 and which have not been deflected into the reject channel 20 are suctioned from the die plate 10 into the satisfactory channel 18 and discharged through the satisfactory channel 18 into a rising channel portion 38 (FIG. 3) of a conveyor channel adjoining the satisfactory channel 18. As may be identified in particular in FIG. 3, the rising channel portion 38 leads to a higher height level relative to the second vacuum apparatus 34. Optionally, one or more further vacuum apparatuses may be provided further along the path of the conveyor channel.

Figure 3:
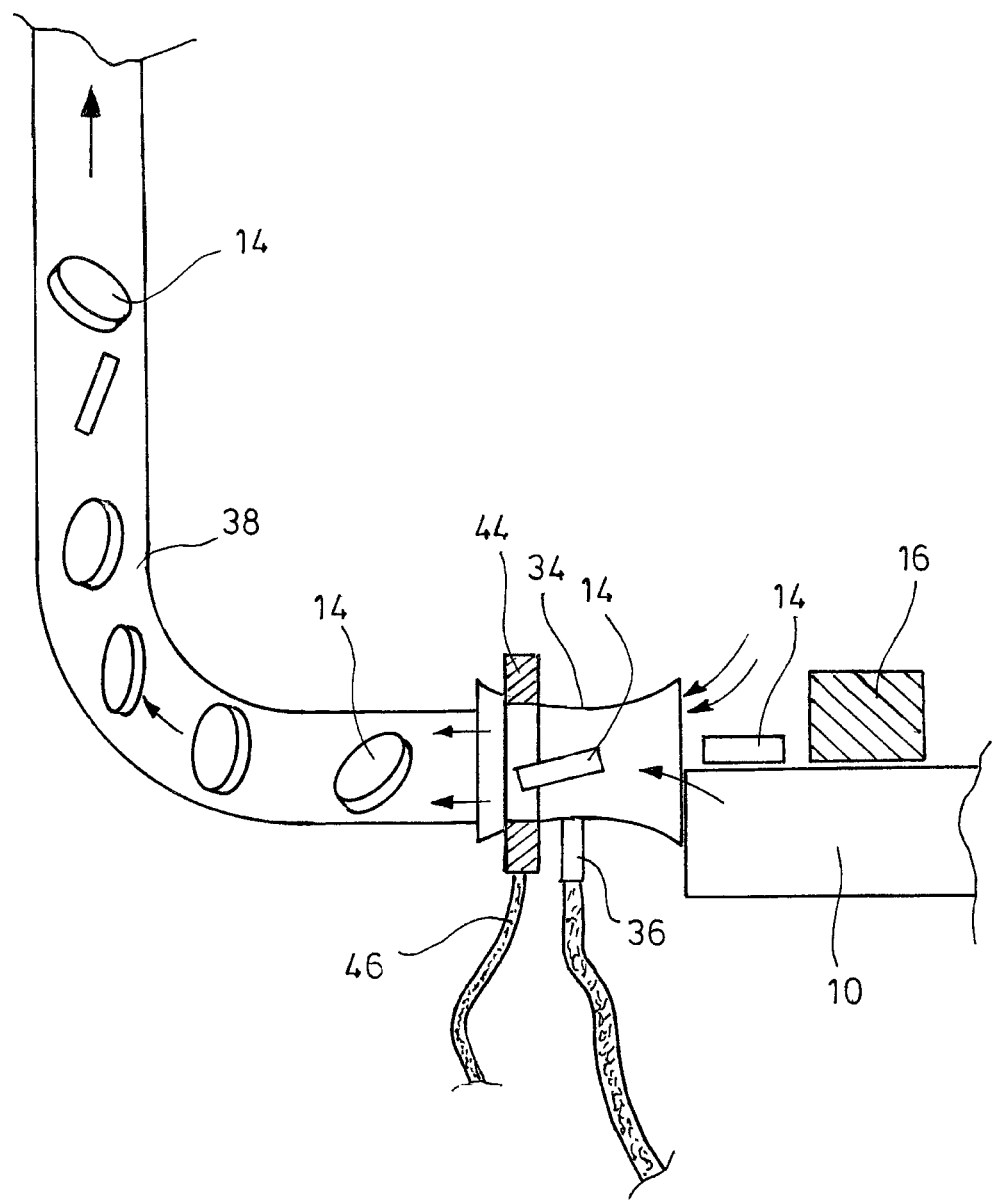
FIG. 3 illustrates a cross section view of the rotary tablet press of FIG. 1 along the line 3-3.

Referring to FIG. 2, the first vacuum apparatus 28 has a tubular light barrier 40 located in the direction of flow just downstream of the connector of the suction pipe portion 30. Via a line 42, said tubular light barrier 40 is, for example, connected to the machine controller of the rotary tablet press. As shown in FIG. 3, the second vacuum apparatus 34 has a tubular light barrier 44 also located in the direction of flow just downstream of the connector of the suction pipe portion 36. In an embodiment, the tubular light barrier 44 is also connected via a line 46 to the machine controller of the rotary tablet press. The tubular light barriers 40, 44 detect tablets 14 conveyed past. In particular, the tubular light barrier 40 provided in the first vacuum apparatus 28 detects a tablet 14 ejected by the ejection nozzle 24 and ejected into the reject channel 20, and the tubular light barrier 44 arranged in the second vacuum apparatus 34 correspondingly detects a gap in the tablet flow deflected by the deflector 16 into the satisfactory channel 18. In this manner, a reliable redundant detection of the ejected tablets is ensured.

The invention claimed is:
1. A rotary tablet press comprising:
a rotatably driven rotor having a die plate with die bores, the die plate including an upper face;
a plurality of upper and lower punches configured to rotate with the die plate and produce tablets within the die bores;
a deflector configured to deflect satisfactory tablets from the upper face of the die plate into a satisfactory channel;
an ejection apparatus configured to eject reject tablets into a reject channel, the reject channel positioned upstream of the satisfactory channel;

a monitoring apparatus configured to monitor at least one property of the tablets, the monitoring apparatus configured to produce a reject signal when the at least one property of the tablets deviates inadmissibly from a reference value;

a control apparatus configured to receive the reject signal from the monitoring apparatus and actuate the ejection apparatus for ejecting the reject tablets;

a first detector apparatus positioned in the reject channel, the first detector apparatus configured to detect reject tablets passing through the reject channel;

a second detector apparatus positioned in the satisfactory channel, the second detector apparatus configured to detect satisfactory tablets flowing through the satisfactory channel;

a first vacuum apparatus positioned in the reject channel and configured to produce a first vacuum; the first vacuum configured to discharge reject tablets through the reject channel; and a second vacuum apparatus positioned in the satisfactory channel and configured to produce a second vacuum; the second vacuum configured to suction satisfactory tablets deflected by the deflector in a direction of the satisfactory channel from the die plate and through the satisfactory channel, wherein the second detector apparatus is further configured to detect gaps in the satisfactory tablets flowing through the satisfactory channel, and wherein the gaps correspond to the reject tablets that were previously ejected.

2. The rotary tablet press according to claim 1, wherein at least one of the first detector apparatus and the second detector apparatus comprises a light barrier.

3. The rotary tablet press according to claim 1, wherein at least one of the first vacuum apparatus and the second vacuum apparatus is a Venturi nozzle.

4. The rotary tablet press according to claim 1, wherein the first detector apparatus is arranged in the first vacuum apparatus and the second detector apparatus is arranged in the second vacuum apparatus.

5. The rotary tablet press according to claim 1, further comprising a vacuum control apparatus configured to control the first vacuum produced by the first vacuum apparatus and the second vacuum produced by the second vacuum apparatus, the vacuum control apparatus configured to adjust the first vacuum and the second vacuum independently of one another.

6. A rotary tablet press comprising:

a rotatably driven rotor having a die plate with die bores, the die plate including an upper face;

a plurality of upper and lower punches configured to rotate with the die plate and produce tablets within the die bores;

a deflector configured to deflect satisfactory tablets from the upper face of the die plate into a satisfactory channel;

an ejection apparatus configured to eject reject tablets into a reject channel, the reject channel positioned upstream of the satisfactory channel;

a monitoring apparatus configured to monitor at least one property of the tablets, the monitoring apparatus configured to produce a reject signal when the at least one property of the tablets deviates inadmissibly from a reference value;

a control apparatus configured to receive the reject signal from the monitoring apparatus and actuate the ejection apparatus for ejecting the reject tablets;

a first detector apparatus positioned in the reject channel, the first detector apparatus configured to detect reject tablets passing through the reject channel; and a second detector apparatus positioned in the satisfactory channel, the second detector apparatus configured to detect satisfactory tablets flowing through the satisfactory channel, wherein the second detector apparatus is further configured to detect gaps in the satisfactory tablets flowing through the satisfactory channel, and wherein the gaps correspond to the reject tablets that were previously ejected.

7. The rotary tablet press of claim 6, further comprising:

a first vacuum apparatus positioned in the reject channel and configured to produce a first vacuum; the first vacuum configured to discharge reject tablets through the reject channel; and a second vacuum apparatus positioned in the satisfactory channel and configured to produce a second vacuum; the second vacuum configured to suction satisfactory tablets deflected by the deflector in a direction of the satisfactory channel from the die plate and through the satisfactory channel.

8. The rotary tablet press according to claim 6, wherein at least one of the first detector apparatus and the second detector apparatus comprises a light barrier.

9. The rotary tablet press according to claim 7, wherein at least one of the first vacuum apparatus and the second vacuum apparatus is a Venturi nozzle.

10. The rotary tablet press according to claim 7, wherein the first detector apparatus is arranged in the first vacuum apparatus and the second detector apparatus is arranged in the second vacuum apparatus.

11. The rotary tablet press according to claim 7, further comprising a vacuum control apparatus configured to control the first vacuum produced by the first vacuum apparatus and the second vacuum produced by the second vacuum apparatus, the vacuum control apparatus configured to adjust the first vacuum and the second vacuum independently of one another.

* * * * *